US005487640A

United States Patent [19]

Shaffer

[11] Patent Number: 5,487,640

[45] Date of Patent: Jan. 30, 1996

[54] BALANCING RINGS FOR ASSEMBLED STEAM TURBINES

[75] Inventor: Carl F. Shaffer, Naperville, Ill.

[73] Assignee: Dresser-Rand Company, Corning, N.Y.

[21] Appl. No.: 258,405

[22] Filed: Jun. 13, 1994

Related U.S. Application Data

[63] Continuation-in-part of Ser. No. 214,762, Mar. 16, 1994, abandoned.

[51] Int. Cl.[6] .............. F01D 25/00

[52] U.S. Cl. .............. 415/119; 416/144; 74/573 R; 29/447; 29/901

[58] Field of Search .............. 416/144, 145; 415/119; 74/573 R; 29/901, 447, 401.1, 402.04, 402.09

[56] References Cited

U.S. PATENT DOCUMENTS

| | | | |
|---|---|---|---|
| 416,253 | 12/1889 | Bordman | 74/573 R |
| 1,314,575 | 9/1919 | Davidson | 74/573 R |
| 1,776,125 | 9/1930 | Linn | 416/144 |
| 3,974,700 | 8/1976 | Webb | 416/144 |
| 3,985,465 | 10/1976 | Sheldon et al. . | |
| 4,236,425 | 12/1980 | Bellati et al. . | |
| 4,455,887 | 6/1984 | Lissajoux et al. . | |
| 4,477,226 | 10/1984 | Carreno . | |
| 4,817,455 | 4/1989 | Buxe . | |
| 4,856,964 | 8/1989 | Stock . | |
| 4,867,006 | 9/1989 | Giberson et al. . | |
| 4,976,585 | 12/1990 | Mezzedimi et al. . | |
| 5,007,305 | 4/1991 | Linder . | |
| 5,235,228 | 8/1993 | Nakanura et al. | 74/573 R |

FOREIGN PATENT DOCUMENTS

| | | | |
|---|---|---|---|
| 26382 | of 1909 | United Kingdom | 416/144 |

*Primary Examiner*—Edward K. Look
*Assistant Examiner*—James A. Larson
*Attorney, Agent, or Firm*—Nixon, Hargrave, Devans & Doyle

[57] ABSTRACT

The present invention is directed to an assembled steam turbine with at least one balancing ring. The assembled steam turbine includes a shaft rotatable about an axis and a housing, defining a machine interior. The housing has first and second axially-spaced end walls, with the shaft extending through the first end wall. A first bearing and a second bearing rotatably support the shaft. The first and second bearings are axially spaced along the shaft and at least the first bearing is positioned outside the machine interior, proximate the first end wall of the housing. At least one balancing ring which has a plurality of radial holes is coaxially-mounted on the shaft outside the machine interior between the first end wall of the housing and the first bearing. A method for balancing the assembled steam turbine disclosed above includes several steps. In this process, the angular position of unbalance in the shaft is determined and one or more plugs is added to one or more of the radial holes in the first balancing ring to balance the shaft in response to the determined angular position of unbalance.

19 Claims, 4 Drawing Sheets

BALANCING RINGS FOR ASSEMBLED STEAM TURBINES

This is a continuation-in-part of application No. 08/214,762 filed on Mar. 16, 1994 abandoned.

FIELD OF THE INVENTION

This invention relates to balancing rings, particularly for assembled steam turbines, which are easy to access during trim balancing.

BACKGROUND OF THE INVENTION

Steam turbines are used in a variety of different applications, such as driving centrifugal compressors, electrical generators in power plants or the propellers of ships and submarines. Steam turbines operate by converting the heat energy of high pressure steam into rotational mechanical shaftwork. The steam turbine includes bladed wheel assemblies coaxially-mounted on a shaft rotating about an axis and enclosed by a housing to contain the high pressure steam. The bladed wheel assemblies have a plurality of buckets upon which the steam impinges to drive the shaft.

Steam turbines usually rotate at high rotational speeds, so that only small changes in mass distribution can have an effect on balance. For example, if one or more of the bladed wheel assemblies coaxially-mounted on the shaft moves slightly, the steam turbine can go out of balance. When the steam turbine is out of balance, the shaft vibrates and can bow and possibly break. Prior methods and devices for correcting imbalance problems are difficult to use, expensive, and time consuming.

For example, many steam turbines are designed with either holes drilled into the shaft adjacent to the bladed wheel assemblies or holes drilled into sleeves which are coaxially mounted on the shaft adjacent the bladed wheel assemblies. The holes are designed to receive weights to help balance the shaft. Long and narrow passages are provided in the housing, which surrounds the bladed wheel assemblies and shaft, to provide access to the holes so weights can be added for trim balancing of the steam turbine. Although adding weights helps to balance the steam turbine, accessing the holes through these passages is very difficult. Often a portion of the housing must be removed to get to the passages which lead to the holes in the shaft.

Other steam turbines, particularly older steam turbines, do not even have holes drilled in the shaft adjacent the bladed wheel assemblies or holes drilled in sleeves mounted adjacent to the bladed wheel assemblies in which weights could be added for trim balancing. As a result, the balancing operation for these steam turbines is even more difficult and time consuming. When the bladed wheel assemblies on the shafts in these steam turbines go out of balance, the steam turbine must be stopped, disassembled, and the parts of the steam turbine must be balanced in a balancing machine usually at an external facility to correct for any balancing problems.

Accordingly, there is a need for an apparatus and method to balance assembled steam turbines, without having to access balancing holes in the shaft or in sleeves on the shaft through long narrow passages in the housing or without having to perform major disassembly of the steam turbine.

SUMMARY OF THE INVENTION

The present invention is directed to an assembled steam turbine which includes a shaft rotatable about an axis and a housing, defining a machine interior. The housing has a first end wall, with the shaft extending through the first end wall. First and second bearings rotatably support the shaft. The first and second bearings are axially spaced along the shaft and at least the first bearing is positioned outside the machine interior proximate the first end wall of the housing. At least one balancing ring which has a plurality of holes and is coaxially-mounted on the shaft outside the machine interior between the first end wall of the housing and the first bearing.

A method for balancing the assembled steam turbine disclosed above includes several steps. First, the assembled steam turbine is run and the angular position of unbalance in the shaft is determined. Next, based upon the determined angular position of unbalance, one or more plugs is added to one or more of the radial holes in the balancing ring to balance the shaft.

The balance rings are assembled on to the shaft when the shaft with the bladed wheel assemblies is outside the housing. Each of the balancing rings is heated until its' inner diameter is larger than the diameter of the shaft. Each balancing ring is then coaxially mounted on to opposing ends of the shaft adjacent the remaining portion of the steam flinger, When the balancing rings cool, they are shrunk-fit to the shaft. Additional balancing rings can be installed as space and criteria permit.

Locating the balancing rings outside of the machine interior of the housing, between the housing and the bearings provides a number of advantages. With the balancing rings exposed, an operator can more easily and quickly access the balancing rings during trim balancing operations, than with prior systems. Additionally, there is no need for the housing to be constructed with a long and narrow passages to reach the balancing holes, which are difficult and time consuming to use. Further, there is no need for major disassembly of the steam turbine to perform trim balancing operations, since plugs for balancing can be added without taking apart the steam turbine.

BRIEF DESCRIPTION OF THE DRAWINGS

FIG. 4(*b*) is a partial side view of the steam turbine rotor of FIG. 4(*a*) with the balancing rings in place.

DETAILED DESCRIPTION OF THE INVENTION

Figure 1:
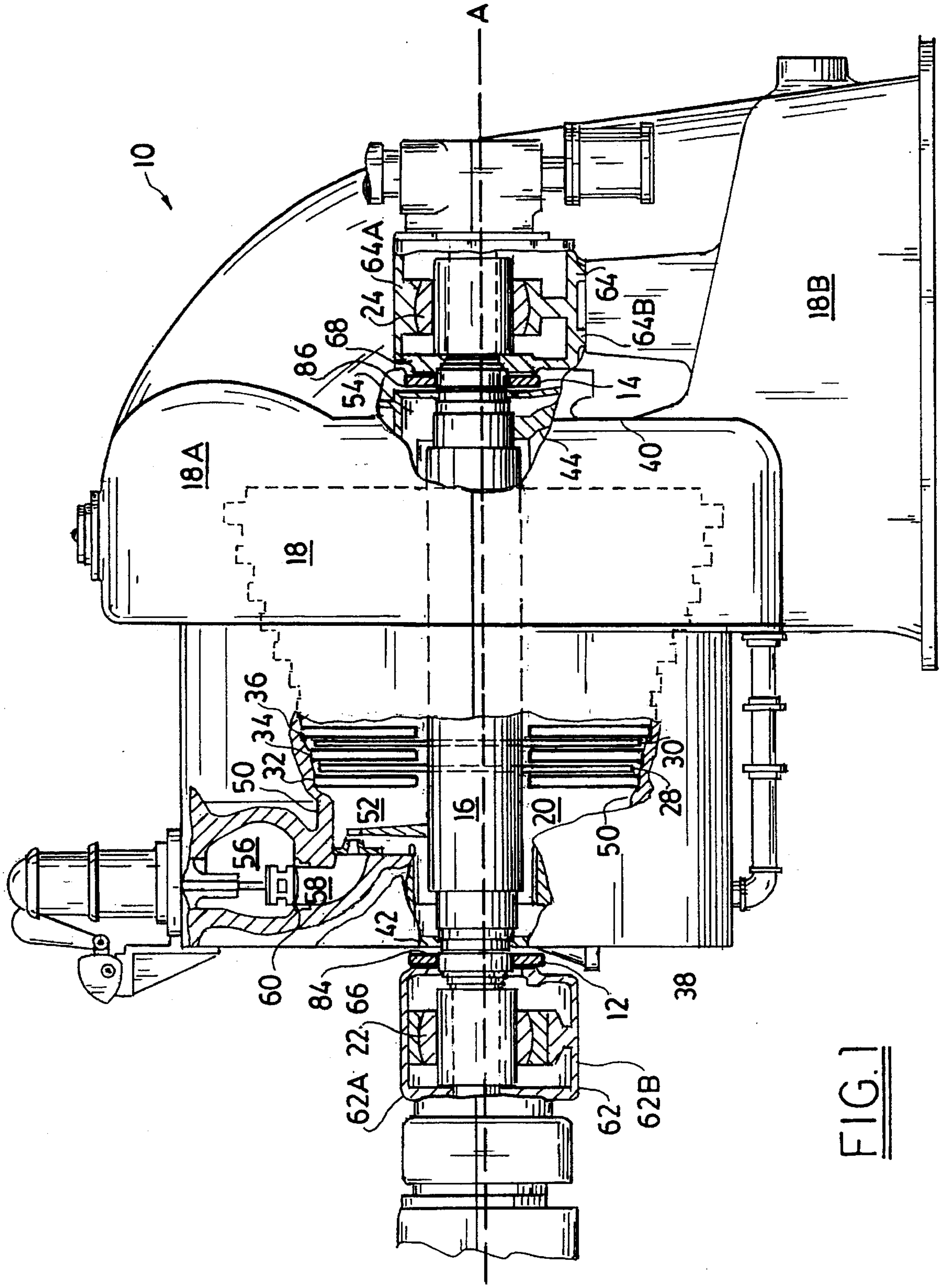
FIG. 1 is a cross-sectional view of an assembled steam turbine with balancing rings in accordance with the present invention.

An assembled steam turbine 10 with first and second balancing rings 12 and 14 in accordance with the present invention is illustrated in FIG. 1. The assembled steam turbine 10 includes a shaft 16 rotatable about an axis A, a housing 18 defining a machine interior 20 and surrounding the shaft 16, thrust and front bearings 22 and 24 for rotatably supporting the shaft 16, and the first and second balancing rings 12 and 14. The first balancing ring 12 is located outside the machine interior 20 of the housing 18 between the housing 18 and the thrust bearing 22 and the second balancing ring 14 is located outside the machine interior 20 of the housing 18 between the housing 18 and the front bearing 24. With the first and second balancing rings 12 and 14 exposed, an operator can more easily and quickly access the first and second balancing rings 12 and 14 during trim balancing operations, than with prior systems. Additionally, with the first and second balancing rings 12 and 14 located outside of the housing 18, there is no need for the housing 18 to be constructed with long and narrow passages to reach the balancing holes, which are difficult and time consuming to use. Further, there is no need for major disassembly of the steam turbine 10 to perform trim balancing operations, since plugs 26 (see FIG. 3) for balancing can be added without taking apart the steam turbine 10.

Referring to FIG. 1, a cross-sectional view of the assembled steam turbine 10 is illustrated. The assembled steam turbine 10 has the shaft 16 which rotates about axis A and is used to drive a system (not shown). The shaft 16 has a rod-like shape and the radius of the shaft 16 varies throughout its length. Typically, the shaft 16 will be constructed from materials, such as alloy steel, although the shaft 16 could have other shapes and dimensions and could be constructed from other materials, as desired and needed.

A plurality of bladed wheel assemblies 28 and 30 are coaxially-mounted on the shaft 16 in the machine interior 20 of the housing 18. The shaft 16 and bladed wheel assemblies form a rotor. Each bladed wheel assembly 28 and 30 includes a plurality of curved-shaped blades known as "buckets" (not shown). As shown in U.S. Pat. No. 3,985,465 to Sheldon, et al., which is hereby incorporated by reference, the bladed wheel assemblies 28 and 30 drive the shaft 18 when steam (or another driving fluid) impinges on the buckets. In this particular embodiment, the bladed wheel assemblies 28 and 30 have a diameter ranging between 40" and 72", although the bladed wheel assemblies 28 and 30 could have other dimensions as needed and desired.

Figure 4A:
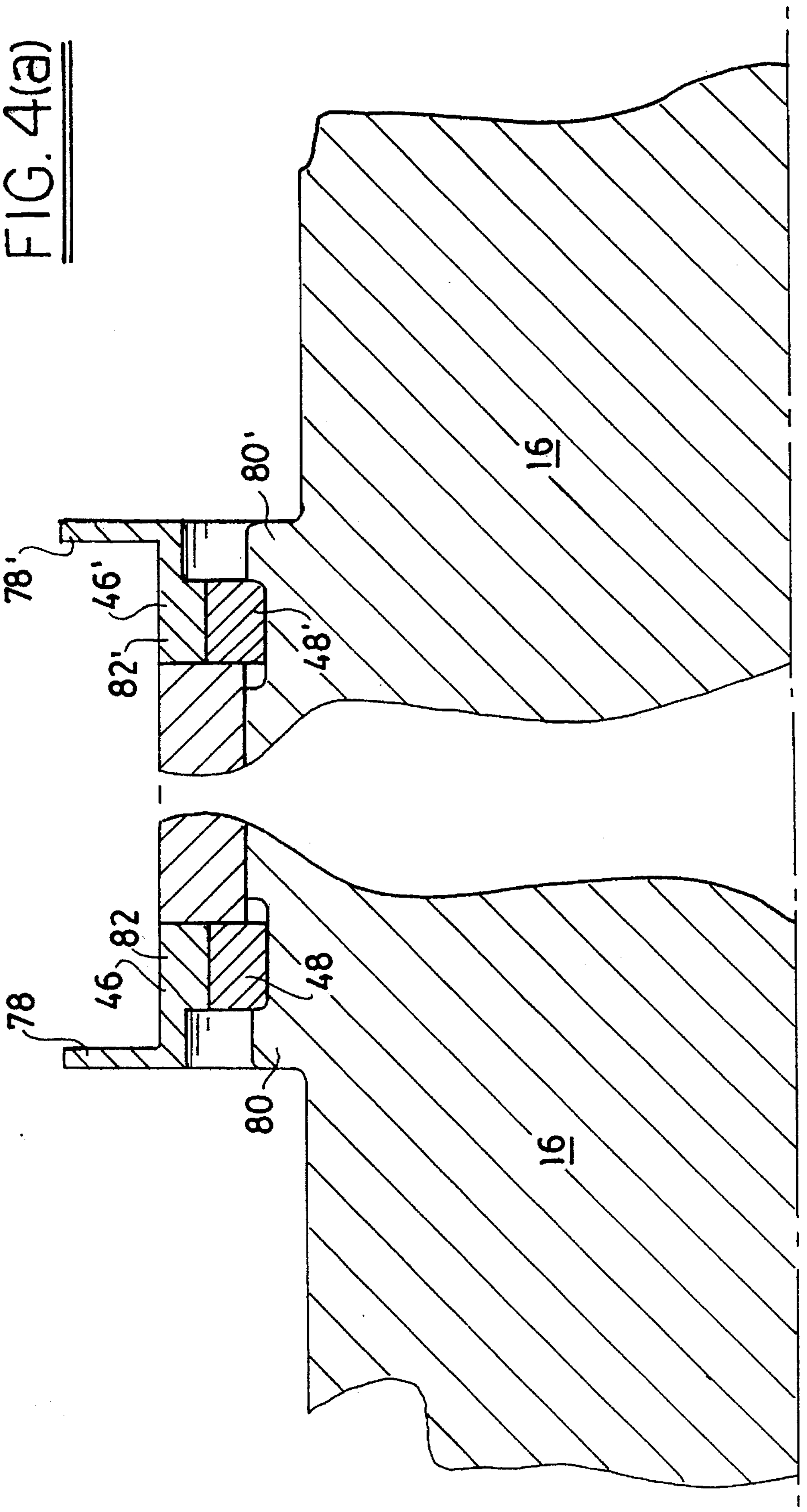
FIG. 4(*a*) is a partial side view of a steam turbine rotor before the balancing rings are installed.
Figure 4B:
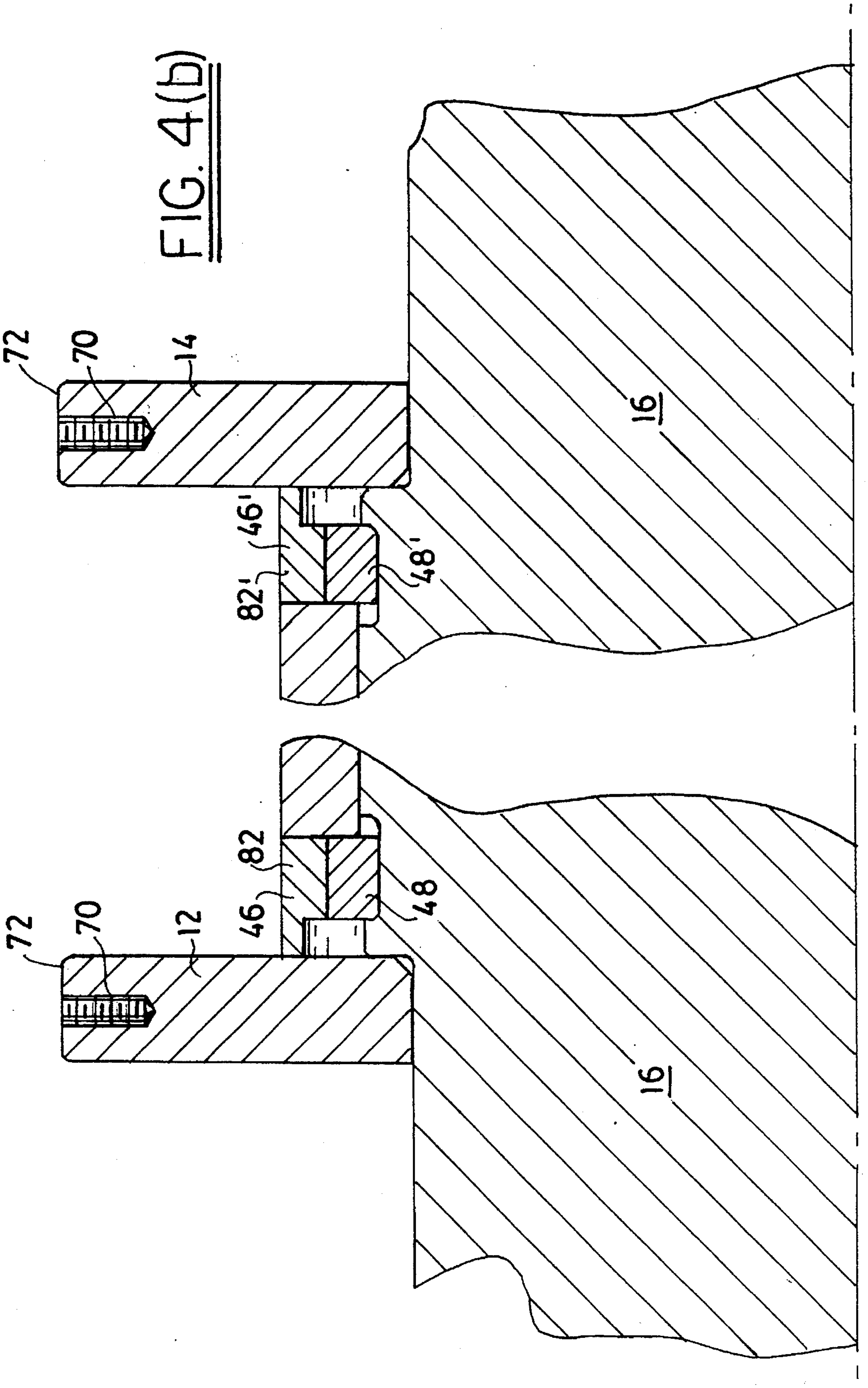

The shaft 16 extends through the housing 18 which has a first and second axially spaced end walls 38 and 40. The first and second end walls 38 and 40, each have an opening 42 and 44 through which the shaft 16 extends. In this particular embodiment, each opening 42 and 44 has a diameter of about 12" and there is a radial clearance of about 0.008" between each opening 42 and 44 and the shaft 16. It would be appreciated by one skilled in the art that the housing 18 could have various shapes and configuration and that the size of the openings 42 and 44 can vary as needed to accommodate different sizes of shafts 16. The housing 18 includes an upper half 18A which is adapted to fit together with a lower half 18B. As shown in FIG. 4(*a*) which is a partial side view of the steam turbine rotor before the balancing rings are installed, steam flingers 46 and 46' are coaxially-mounted on the shaft 16 adjacent the location of each of the openings 42 and 44 and helps to prevent steam from escaping through either of the openings 42 and 44. Each steam flinger 46 and 46' is mounted upon a split ring 48 and 48', also shown in FIG. 4(*a*). Referring back to FIG. 1, a generally frusto-conical surface 50 of the housing 18 extends around the bladed wheel assemblies 28 and 30 which are coaxially-mounted on the shaft 16. In this particular embodiment, there is a clearance of between ⅜" and 1" between the end of each bladed wheel assembly 28 and 30 and the surface 50, although the shape of the surface 50 and the gap between each bladed wheel assembly 28 and 30 and the surface 50 can vary as needed and desired. An inlet stage 52 is located in the housing 18 before the first bladed wheel assembly 28 and an exhaust labyrinth 54 is located after the last bladed wheel assembly (shown in phantom) in the housing 18.

A plurality of stators or diaphragms 32, 34 and 36 descend radially down from the surface 50 in the housing 18 with bladed wheel assemblies 28 and 30 being positioned between stators 32, 34, or 36. Each stator 32, 34, and 36 has a plurality of stationary passages known as "nozzles" (not shown). As shown in U.S. Pat. No. 3,985,465 to Sheldon, et al., which is hereby incorporated by reference, the nozzles alter the direction of the steam before it strikes the buckets. In this particular embodiment, the stators 32, 34, and 36 have a diameter ranging between 30" and 76", and have a radial clearance distance from the shaft 16 ranging between 0.012" and 0.014", although the stators 32, 34, and 36 could have other diameters and different clearance distances as needed and desired. Typically, the diameter of the stators 32, 34, and 36 and bladed wheel assemblies 28 and 30 becomes progressively larger from the inlet stage 52 to the exhaust labyrinth 54 in the housing 18. The rest of the bladed wheel assemblies and stators are shown in phantom in FIG. 1. The number of bladed wheel assemblies and stators can vary as needed and desired.

A steam admission passage 56 is connected to a source of high pressure steam (not shown) and also to a curved passage 58. A valve 60 separates the steam admission passage 56 from the curved passage 58 and controls the flow of the steam between the two passages 56 and 58. The curved passage 58 leads to the inlet stage 52 located in front of the first stator 32 and first bladed wheel assembly 28.

The ends of the shaft 16 extending from the openings 42 and 44 in the first and second end walls 38 and 40 in the housing 18 are rotatably supported by the thrust bearing 22 and the front bearing 24, respectively. The thrust bearing 22 and front bearing 24 are each surrounded by a casing 62 and 64. Each casing 62 and 64 has an upper half 62A and 64A, respectively, which is adapted to fit on a lower half 62B and 64B, respectively. Each casing 62 and 64 also has a central aperture 66 and 68 which permits the shaft 16 to extend into and engage with the thrust bearing 22 and front bearing 24. In this particular embodiment, each central aperture 66 and 68 has a radius of ½" and there is a clearance of 0.008" and 0.010" between the shaft 16 and each central aperture 66 and 68, although the radius of the central apertures 66 and 68 and the amount of clearance can vary as needed and desired. Although the thrust and front bearings 22 and 24 are shown outside of the housing 18, either one could be disposed within the housing 18, provided that the bearing with the balancing ring in accordance with the present invention is outside housing 18. In addition, the steam turbine 10 could have more bearings if needed or desired.

The first and second balancing rings 12 and 14 are each coaxially mounted on the shaft 16. The first balancing ring 12 is mounted between the first end wall 38 of the housing 18 and the thrust bearing 22 and the second balancing ring 14 is mounted between the second end wall 40 of the housing 18 and the front bearing 24. In this particular embodiment, there is approximately a 2" space on the shaft 16 between the first end wall 38 of the housing 18 and the thrust bearing 22 and approximately a 2" space on the shaft 16 between the second end wall 40 of the housing 18 and the front bearing 24, although the amount of space can vary based upon the particular machine. The amount of space available at these locations effects the width and overall size of the balancing rings 12 and 14 which could be used. Additionally, although two balancing rings 12 and 14 are illustrated in this particular embodiment, the assembled steam turbine 10 could operate with only the first or second balancing rings 12 and 14 in place or with more than the first and second balancing rings 12 and 14, if desired and needed.

Further, although the first and second balancing rings 12 and 14 are shown on an assembled steam turbine 10, a first and/or a second balancing ring 12 and/or 14 could also be used on other rotary machines, such as centrifugal compressors.

Figure 2:
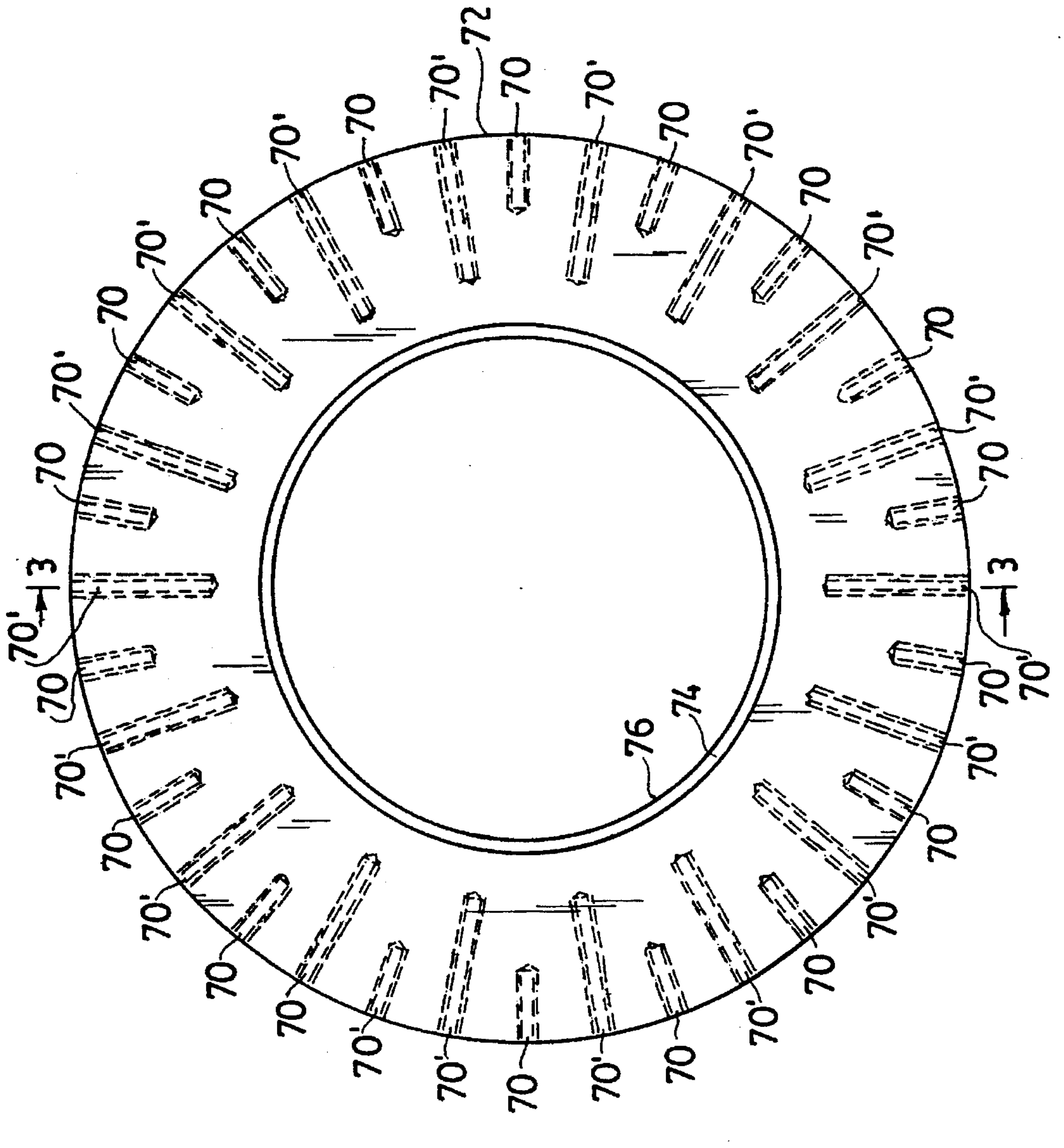
FIG. 2 is a side cross-sectional view of one of the balancing rings of FIG. 1.

Referring to FIG. 2, a side view of the first balancing ring 12 is illustrated. Since the second balancing ring 14 is substantially identical to the first balancing ring 12, it will not be discussed separately. The first balancing ring 12 has a circular configuration and has thirty-six radially holes 70 and 70' spaced along the outer periphery 72 at ten degree intervals. The radial holes 70 are between ½" to ¾" in diameter and are about 1½" deep and the radial holes 70' are ½" to 3" in diameter and are about 3" deep. In an alternative embodiment, every other radial hole 70 and 70' may have substantially the same depth. Although the holes 70 and 70' are shown extending radially inward, the holes 70 and/or 70' could be drilled at other angles, if desired. In this particular embodiment, the first balancing ring 12 has an inner diameter of 9.99" and an outer radius having a range of 18", although it would be appreciated by one skilled in the art that each balancing ring 12 and 14 could have different dimensions with different numbers of radial holes 70 and 70' with different depths and diameters for those radial holes 70 and 70', as needed and desired. When the first and second balancing rings 12 and 14 are shrink-fitted onto the shaft 16, there is typically a shrink of between 0.010" and 0.012" between each balancing rings 12 and 14 and the shaft 16, although this shrink can vary as necessary to coaxially-mount the first and second balancing rings 12 and 14.

Figure 3:
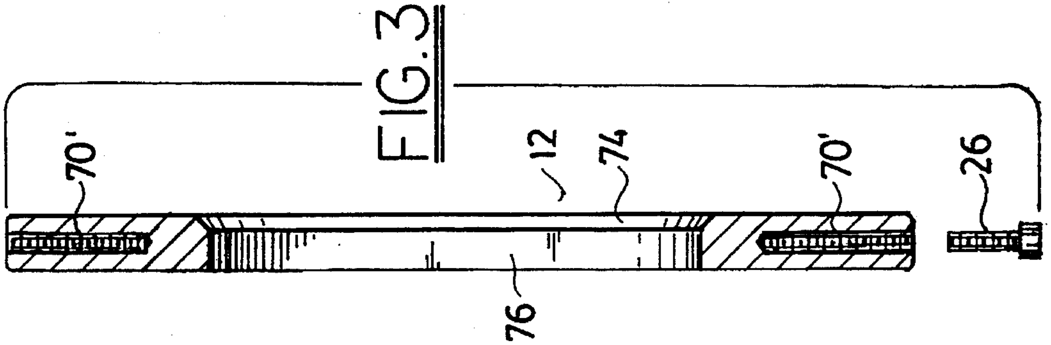
FIG. 3 is a cross-sectional view of the balancing ring shown in FIG. 2 taken along line 3—3.

Referring to FIG. 3, a cross-sectional view of the first balancing ring 12 taken along line 3—3 of FIG. 2 is illustrated. In this particular embodiment, the first balancing ring 12 has a width of about 1" and has chamfer 74 along the inner circumference 76 at an angle of about 45° for a depth of about a ¼", although the width, angle for chamfering and depth of the chamfering can vary as needed and desired. The inner circumference 76 is chamfered because it mounts against a shoulder on the shaft 16. Plugs 26 can be screwed into one or more of the holes 70 and 70' during the balancing operation to add weight to each of the balancing rings 12 and 14 to correct for any balancing problems. In this particular example, the plugs 26 weigh between 10 grams and 80 grams each, although the plugs 26 could be made to have different weights as needed and desired. Additionally, the plugs 26 may simply be threaded socket set screws which could mate with the radial holes 70 and 70' which would also then need to be threaded. Further, one or more set screws or keys (not shown) may also be included to secure the balancing rings 12 and 14 to the shaft 16 to prevent the balancing rings 12 and 14 from turning on the shaft 16 during operation of the steam turbine.

The assembled steam turbine 10 shown in FIG. 1 operates when steam passes into the steam admission passage 56, past the valve 60, down through the curved passage 58 to the inlet stage 52. The steam in the inlet stage 52 impinges on the first stator 32 which has a plurality of nozzles (not shown) that redirect the steam towards the first bladed wheel assembly 28. The steam passes from the nozzles in the first stator 32 to the buckets in the first bladed wheel assembly 28, causing the first bladed wheel assembly 28 to rotate thus driving the shaft 16. The surface 50 directs the steam to continue to pass from stator to bladed wheel assembly, driving the shaft 16. Eventually, the steam passes through all of the stators and bladed wheel assemblies and enters the exhaust labyrinth 54 from which steam exits. The shaft 16 rotates on the thrust bearing 22 and front bearing 24 and the shaft's rotation drives a system (not shown). Typically, a steam turbine rotates in ranges between 2000 and 8000 RPM, although one skilled in the art would appreciate that the turbine 10 can run at other speeds. Since the steam turbine 10 rotates at a high speed, only a small change in the distribution of weight in the steam turbine 10 can have an effect on balance. For example, if one of the bladed wheel assemblies 28 and 30 moves slightly on the shaft 16, the change in weight distribution can cause the shaft 16 to vibrate. These vibrations effect the performance of the steam turbine 10 and can cause the shaft 16 to bend and break. As a result, it is periodically necessary to balance steam turbine 10.

Referring to FIGS. 4(*a*) and 4(*b*), partial side views of the steam turbine 10 during installation of the first and second balancing rings 12 and 14 are shown. The first and second balancing rings 12 and 14 are used to help balance the steam turbine 10. Typically, the first and second balancing rings 12 and 14 are individually balanced on a mandrel (not shown) prior to being coaxially-mounted on the shaft 16. The rotor must be removed from the turbine casing 18A and 18B to add the balance rings. To do this, the upper half 18A of housing 18 along with the upper halves 62A and 64A of casings 62 and 64 are removed. Next, the shaft 18 with bladed wheel assemblies 28 and 30 and steam flinger 46 is removed. The outer portion 78 and 78' of the L-shaped steam flinger 46 and 46' is then machined off on each side of the shaft 16, as shown in FIG. 4(*b*). Removing the outer portions 78 and 78' of the steam flingers 46 and 46' on each side of the shaft 16 allows for additional room on the shaft 16 between the first end wall 38 and the thrust bearing 22 and also between the second end wall 40 and the front bearing 24. With the additional room, balancing rings 12 and 14 with larger widths can be used. Balancing rings 12 and 14 with larger widths are desirable because larger radial holes 70 and 70' can be drilled along the outer periphery 72 allowing for larger and heavier plugs 26 to be inserted. The ability to add heavier plugs 26 into one or more radial holes 70 and 70' helps with the trim balancing operation. Next, the portion 80 and 80' of the shaft 16 just below the outer portions 78 and 78' of the L-shaped steam firings 46 and 46' on each side of the shaft 16 which were just machined off is also machined back to be even with the remaining portion 82 and 82' of the steam flingers 46 and 46', again as shown in FIG. 4(*b*).

Once the steam flingers 46 and 46' and shaft 16 have been machined, the first and second balancing rings 12 and 14 can be installed. The first and second balancing rings 12 and 14 are first heated until they expand sufficiently to have a larger inner diameter than the diameter of the shaft 16. The first balancing ring 12 is then coaxially-mounted on to the shaft 16 and is slid down adjacent to the remaining portion 82 of the steam flinger 46 and the second balancing ring 14 is coaxially mounted on to the shaft 16 and is slid down adjacent the remaining portion 82' of steam flinger 46'. When the first and second balancing rings 12 and 14 cool, they are shrink-fitted to the shaft 16. Once the balancing rings 12 and 14 are in place on the shaft 16, the shaft 16 with blade wheel assemblies 28 and 30 and balancing rings 12 and 14 is mounted on the rotor and it is placed in the lower half 18B of the housing 18, in lower casing 62B, and in lower casing 64B and onto thrust bearing 22 and front bearing 24. The upper half 18A of housing 18 and upper casings 62A and 64A are then placed over lower half 18B and lower casings 62B and 64B and are secured together. When upper half 18A and lower half 18B are in place, the first end wall 38 is proximate the first balancing ring 12 and the second end wall 40 is proximate the second balancing ring 14. Positioning the first end wall 38 of the housing proximate the side 84 of the first balancing ring 12 and the second end wall 40 proximate the side 86 of the second balancing ring 14 eliminates the need for the steam flingers 78 and 78' because side 84 of first balancing ring 12 and side 86 of the second balancing ring 14 can act as the steam flingers 78 and 78' and redirect any steam back to the machine interior 20. Although the first and second balancing rings 12 and 14 are described as being installed on to the shaft 16, it would be appreciated by one skilled in the art that the particular method of installation can vary and if desired only one of the first and second balancing rings 12 and 14 could be installed. Once balancing rings 12 and 14 are installed on the rotor, the steam turbine rotor can be periodically balanced without repeating the installation operation.

To balance the assembled steam turbine 10, X-Y eddy current proximity probes (not shown) and an eddy current proximity key phaser probe (not shown) are placed at the thrust and front bearings 22 and 24 of steam turbine 10 to determine the angular position of unbalance. When the probes are in place, the steam turbine 10 is run at operating speeds and readings are taken to determine the position of angular unbalance. When the readings are completed, the steam turbine 10 is shut down. Next, based upon the angular position of unbalance determined from the readings from the probes, plugs 26 of various selected weights are added to one or more radial holes 70 and 70' of the first and/or the second balancing rings 12 and 14 to correct for any imbalance. It is not necessary to try and access holes in the shaft 16 in the machine interior 20 or to disassemble and reposition any of the bladed wheel assemblies 28 and 30 on the shaft 16. The radial holes 70 and 70' can be easily and quickly accessed to add plugs 26 by an operator from outside of the machine interior 20, minimizing downtime for the steam turbine 10. Once the plugs 26 are in place, the steam turbine 10 is again started up and new readings are taken again to determine the angular position of any remaining unbalance and to shut down the steam turbine 10 and add any more plugs 26 if there still is unbalance.

Having thus described the basic concept of the invention, it will be readily apparent to those skilled in the art at the foregoing detailed disclosure is intended to be presented by way of example only and is not limiting. Various alterations, improvements and modification will occur to those skilled in the art, though not expressly stated herein. These modifications, alterations, and improvements are intended to be covered hereby, and are within the spirit and scope of the invention.

What is claimed:

1. A rotary machine comprising:

a shaft rotatable about an axis;

a housing defining a machine interior and having a first end wall through which said shaft extends;

first and second bearings for rotatably supporting said shaft, wherein said first and second bearings are axially spaced and at least said first bearing is positioned outside the machine interior and proximate said first end wall of said housing; and at least one balancing ring having a plurality of holes, said balancing ring being coaxially-mounted on said shaft outside the machine interior between said end wall of said housing and said first bearing.

2. The rotary machine according to claim 1 further comprising:

at least one plug placed in at least one of said plurality of holes to balance said shaft.

3. The rotary machine according to claim 2 wherein said plurality of holes extend radially inward from an outer periphery of said balancing ring.

4. The rotary machine according to claim 1 wherein said housing has a second end wall axially spaced from said first end wall and through which said shaft extends and said second bearing is positioned outside the machine interior and proximate said second end wall of said housing.

5. The rotary machine according to claim 4 wherein another of said balancing rings is coaxially-mounted on said shaft outside the machine interior between said second end wall of said housing and said second bearing.

6. The rotary machine according to claim 5 further comprising:

a first and second casing, said first casing surrounding said first bearing and having a first opening coaxial with the axis to permit said shaft to extend into and engage with said first bearing and said second casing surrounding said second bearing and having a second opening coaxial with the axis to permit said shaft to extend into and engage with said second bearing.

7. The rotary machine according to claim 1 further comprising one or more axially-spaced bladed wheel assemblies coaxially-mounted on said shaft in said machine interior of said housing.

8. The rotary machine according to claim 7 further comprising one or more axially-spaced stators extending radially inward from said machine interior of said housing.

9. A turbomachine comprising:

a shaft rotatable about an axis;

a housing defining a turbomachine interior and having first and second axially spaced end walls, with the shalt extending through said first and second end walls;

first and second bearings for rotatably supporting said shaft, wherein said first and second bearings are axially spaced and said first bearing is positioned outside the turbomachine interior proximate said first end wall of said housing and said second bearing is positioned outside the turbomachine interior proximate said second end wall of said housing;

a first and second balancing ring each having a plurality of radial holes, said first balancing ring being coaxially-mounted on said shaft outside said turbomachine interior between the first end wall of said housing and said first bearing and said second balancing ring being coaxially-mounted on said shaft outside said turbomachine interior between the second end wall of said housing and said second bearing; and one or more axially-spaced bladed wheel assemblies coaxially-mounted on said shaft in said turbomachine interior of said housing.

10. The turbomachine according to claim 9 further comprising:

one or more axially-spaced stators extending radially inward from said turbomachine interior of said housing towards said shaft, with one of said stators positioned before each said bladed wheel assembly.

11. The turbomachine according to claim 10 further comprising:

at least one plug placed in at least one of said plurality of holes to balance said shaft.

12. The turbomachine according to claim 11 wherein said plurality of holes extend radially inward from the outer periphery of said balancing ring.

13. The turbomachine according to claim 9 further comprising:

a first and second casing, said first casing surrounding said first bearing and having a first opening coaxially with the axis to permit said shaft to extend into and engage with said first bearing and said second casing surrounding said second bearing and having a second opening coaxially with the axis to permit said shaft to extend into and engage with said second bearing.

14. A method for balancing a turbomachine having a shaft rotatable about an axis, the turbomachine including a housing defining a machine interior, the housing having a first upper half and a first lower half and having a first end wall with the shaft extending through the first end wall, and first and second bearings for rotatably supporting the shaft, wherein the first and second bearings are axially spaced and at least the first bearing is positioned outside the machine interior proximate the first end wall of the housing, said method comprising:

determining the angular position of unbalance in the shaft; and adding to a first balancing ring having a plurality of holes and being coaxially-mounted on the shaft outside the machine interior between the first end wall of the housing and the first bearing at least one plug placed in at least one of said plurality of holes to balance the shaft in response to the determined angular position of unbalance.

15. The method according to claim 14 wherein the housing has a second end wall axially spaced from the first end wall, the second bearing being positioned outside the machine interior and proximate the second end wall of the housing, the method further comprising the steps of:

determining the angular position of unbalance in the shaft; and adding to a second balancing ring having a plurality of holes and being coaxially-mounted on the shaft outside the machine interior between the second end wall of the housing and the second bearing at least one plug placed in at least one of said plurality of holes to balance the shaft in response to the determined angular position of unbalance.

16. The method according to claim 15 with a first and second casing each having a second upper half and a second lower half, said first casing surrounding said first bearing and having a first opening coaxial with the axis to permit said shaft to extend into and engage with said first bearing and said second casing surrounding said second bearing and having a second opening coaxial with the axis to permit said shaft to extend into and engage with said second bearing comprising the steps of:

heating the first balancing ring until the inner diameter of the first balancing ring is larger than the diameter of the shaft; coaxially-mounting the first balancing ring on the shaft;

mounting the shaft on to the first and second bearings in the second lower half of the bearing casings and through the first lower half of the housing, with the first balancing ring adjacent the first bearing;

installing the first upper half of the housing and second upper half of the first and second casings on to the first lower half of the housing and on to the second lower half of the first and second casings and around the shaft, the first end wall of the housing proximate the first balancing ring.

17. The method according to claim 16 further comprising the steps of:

heating the second balancing ring until the inner diameter of the second balancing ring is larger than the diameter of the shaft; and coaxially-mounting the second balancing ring on the shaft, with said second balancing ring adjacent the second end wall of the housing and proximate the second bearing when installed.

18. The method according to claim 17 further comprising the steps of:

balancing the first and second balancing rings prior to said steps of heating the first and second balancing rings.

19. The method according to claim 17 wherein a steam flinger is coaxially-mounted on the shaft adjacent the first and second end walls, the method further comprising the steps of:

machining a portion of each steam flinger coaxially-mounted on the shaft off to allow the first and second balancing rings to have a larger width.

* * * * *